(12) United States Patent
Augustdoerfer et al.

(10) Patent No.: US 12,485,763 B2
(45) Date of Patent: Dec. 2, 2025

(54) MODULAR SYSTEM

(71) Applicant: Dr. Ing. h.c. F. Porsche Aktiengesellschaft, Stuttgart (DE)

(72) Inventors: Marco Augustdoerfer, Leonberg (DE); Tim Burrer, Pforzheim (DE); Jens Krueger, Boennigheim (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 224 days.

(21) Appl. No.: 18/126,872

(22) Filed: Mar. 27, 2023

(65) Prior Publication Data
US 2023/0311662 A1    Oct. 5, 2023

(30) Foreign Application Priority Data

Mar. 30, 2022  (DE) ..................... 10 2022 107 477.3

(51) Int. Cl.
*B60L 3/00*     (2019.01)
*B60L 53/66*    (2019.01)
*B60L 58/18*    (2019.01)
*B60R 16/023*   (2006.01)

(52) U.S. Cl.
CPC ............ *B60L 3/0046* (2013.01); *B60L 53/66* (2019.02); *B60L 58/18* (2019.02); *B60R 16/0239* (2013.01)

(58) Field of Classification Search
CPC ........ B60L 3/0046; B60L 53/66; B60L 58/18; B60L 3/12; B60L 50/64; B60L 58/10; B60L 3/0061; B60L 58/12; B60L 58/13; B60R 16/0239; G01R 31/396; G01R 31/3835; H01M 10/425; H01M 10/482; H01M 2010/4271; H01M 2010/4278; H01M 2220/20; H02J 2310/48; H02J 7/0013; H02J 7/0042; H02J 7/0047; H02J 7/0048; Y02T 10/70; B60K 6/42
See application file for complete search history.

(56) References Cited

U.S. PATENT DOCUMENTS

| | | | |
|---|---|---|---|
| 9,496,730 B2 | 11/2016 | Gallegos et al. | |
| 11,258,104 B2* | 2/2022 | Chidester | H01M 50/574 |
| 11,552,479 B2* | 1/2023 | Liu | H02J 7/0063 |

* cited by examiner

*Primary Examiner* — Michael C Zarroli
(74) *Attorney, Agent, or Firm* — Gerald E. Hespos; Michael J Porco

(57) ABSTRACT

A modular system has at least a first module (A, B) and a second module (D, E, H). The modules are configured such that a first apparatus having the first and second modules (A, B, D, E, H) is configured as a first control unit (1) for a first traction battery of a first motor vehicle. The first module (A, B) is configured for first functions of the first control unit (1) and the second module (D, E, H) is configured for second functions of the first control unit (1). The first module (A, B) also is configured such that a second apparatus having the first module (A, B) without the second module (D, E, H) is configured as the second control unit (2, 3) for a second traction battery of a second motor vehicle, with the second functions being absent from the second control unit (2, 3).

9 Claims, 2 Drawing Sheets

| | 2 | 1 | 3 |
|---|---|---|---|
| A | | ⬜ | |
| B | | ⬜ | |
| C | | ⬜ | ⬜ |
| D | | | ⬜ |
| E | | | ⬜ |
| F | F.1 | F.2 | F.3 |
| G | G.1 | G.2 | G.3 |
| H | | ⬜ | |

|   | 2 | 1 | 3 |
|---|---|---|---|
| A |   |   |   |
| B |   |   |   |
| C |   |   |   |
| D |   |   |   |
| E |   |   |   |
| F | F.1 | F.2 | F.3 |
| G | G.1 | G.2 | G.3 |
| H |   |   |   |

Fig. 1

MODULAR SYSTEM

CROSS REFERENCE TO RELATED APPLICATION

This application claims priority on German Patent Application No 10 2022 107 477.3 filed Mar. 30, 2022, the entire disclosure of which is incorporated herein by reference.

BACKGROUND

Field of the Invention. The invention relates to a modular system for producing control units for traction batteries.

Related Art U.S. Pat. No. 9,496,730 B2 discloses a battery management system with several module units. Each module unit monitors the cell voltage, temperature, humidity, and electrical current of battery cells.

An object of the invention is to reduce the cost of production for different control units.

SUMMARY OF THE INVENTION

In the context of this disclosure, "modular system" refers to a system having several modules that can be combined to produce a control unit for a motor vehicle. For example, different modules can be configured for different functions, and adding a specific module enables a specific function to be provided for the control unit. A module of conventional components can differ in that the module is a combination of components already defined in the production of the module, and is added as a whole to the control unit. A modular system having several modules enables different control units with different functions to be produced at a relatively low production cost.

The modular system according to this disclosure comprises a first module and a second module. The first and second modules are configured such that a first apparatus having the first module and the second module is configured as a first control unit for a first traction battery of the motor vehicle. The first control unit also can comprise further components. The first module is configured for first functions of the first control unit, and the second module is configured for second functions of the first control unit. The first module also is configured such that a second apparatus having the first module but not having the second module is configured as the second control unit for a second traction battery of a second motor vehicle. The second control unit lacks the second functions. For example, the first and second motor vehicles can be different motor vehicle models and can differ in terms of other components, apart from the control units.

The modular system disclosed herein enables plural first control units and plural second control units to be produced with little effort. Additionally, a first control unit can be converted into a second control unit simply by adding the second module.

According to one embodiment, the first module is configured to determine a state of charge from cell voltages of several battery cells of the first or second traction battery, to control a discharge of the battery cells during operation of the motor vehicle, to exchange data with other components of the motor vehicle, and/or to establish and interrupt an electrical connection between the respective traction battery and components of the respective motor vehicle. In this case, the first module can be referred to as a battery management system, a battery management controller, and/or a battery junction box.

According to one embodiment, the second module can be configured to switch off a charging unit of the first motor vehicle for charging the first traction battery. For example, the charging unit can be an on-board charger. Alternatively or additionally, the second module can comprise a pre-charging circuit and/or a DC converter.

It is also possible that individual or several of the features previously mentioned in connection with the first and second modules can be provided in a third, fourth, or fifth module of the modular system so that these functions optionally can be added to a control unit to be produced. For example, the second control unit can be configured as a base variant with relatively few functions. Select functions then can be enabled by adding individual modules.

According to one embodiment, the modular system comprises a carrier module for electrical fuses. The carrier module can be configured to carry first electrical fuses when used in the first apparatus and to connect the first electrical fuses electrically to first electrical components of the first traction battery. The carrier module can be configured to carry second electrical fuses when used in the second apparatus and to electrically connect the second electrical fuses to second electrical components of the second traction battery.

In some embodiments, the modular system comprises several first modules and several second modules. Thus, several first and second control units can be produced in a particularly simple manner. It is also possible for the modular system to comprise several third, fourth, and/or fifth modules and/or several carrier modules.

According some embodiments, the modular system can comprise several interfaces and/or several housings. The interfaces can be configured to be connected to the first and/or the second module and to relay data to and from the respective module. The housings can be configured to accommodate the first and/or second module. The interfaces and the housings can be adapted individually to the first motor vehicle or to the second motor vehicle. In this way, the first and the second control units can be adapted to particular circumstances in the respective motor vehicle. Several different housings and interfaces must be reserved for this purpose. However, this disadvantage is balanced by better adjustability.

The interfaces can be configured to be connected to the third, fourth, and/or fifth modules and to relay data to and from the respective module. The housings can also be configured to accommodate the third, fourth, and/or fifth modules.

According to one embodiment, the first module can comprise a digital data memory and a digital data processing unit. The data processing unit can be referred to as a processor. Instructions can be stored in the data memory. The data processing unit can be configured to read out and execute the instructions. The instructions can be configured for use in the first apparatus as well as for use in the second apparatus. The data processing unit can be configured to provide the first functions when the instructions are executed.

The system of some embodiments comprises a first control unit for a first traction battery of a first motor vehicle having the first module and the second module of the modular system, and a second control unit having the first module without the second module for a second traction battery of a second motor vehicle.

The disclosure also relates to a motor vehicle with one of the control units of the system and the first or the second traction battery. The motor vehicle can comprise the first traction battery when the motor vehicle has the first control unit. Alternatively, the motor vehicle can comprise the second traction battery when the motor vehicle has the second control unit.

The disclosure also relates to a method for producing one of the control units of the system described herein. The instructions stored in the data memory of the first and second control units can be replaced by different, vehicle-specific instructions. In this way, the instructions can also be adapted to different motor vehicle models or for different functions. In this context, the term "vehicle-specific" means that the instructions can be adapted at least to the motor vehicle model, but also to an individual vehicle depending on the circumstances.

The method is advantageous for a particularly simple production of different control units. With the instructions originally given in the data memory, an operation of different motor vehicles is possible. By replacing these instructions with the vehicle-specific instructions, a control unit adapted for a specific motor vehicle model or a specific motor vehicle can be created.

Further features and advantages of the invention will become apparent from the following description of one embodiment with reference to the appended illustrations. The same reference numerals are used for the same or similar features and for features having the same or similar functions.

BRIEF DESCRIPTION OF THE DRAWINGS

FIG. 1 is a schematic illustration of a modular system according to one embodiment.

DETAILED DESCRIPTION

Figure 1:
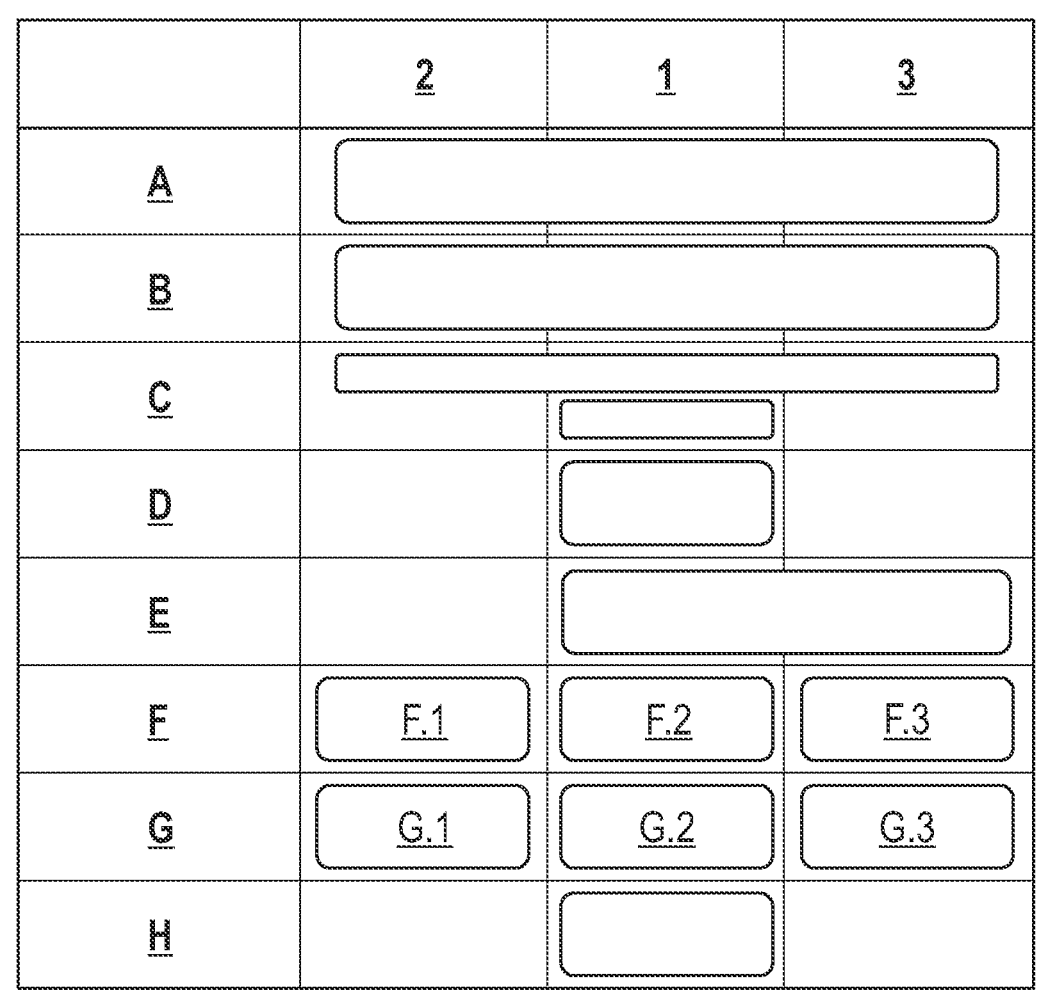

The modular system of FIG. 1 comprises modules A to E and H. The module A or the module B are first modules. The modules A and B are configured for first functions of the control unit. The first functions are basic functions that are to be given for all control units that are to be produced with the modular system. For example, the module A can provide the functions of a battery junction box, and the module B can provide the functions of a battery management system or a battery management control unit.

The module C is configured as a carrier module for electrical fuses and also is installed in all control units to be produced with the modular system.

The modules D, E and H are second modules and are configured for second functions of the control unit. For example, the module D can be configured to switch off a charging unit of the motor vehicle, the module E can comprise a pre-charging circuit and the module H can comprise a DC converter.

The modular system also comprises various interfaces F and housings G.

Figure 2:
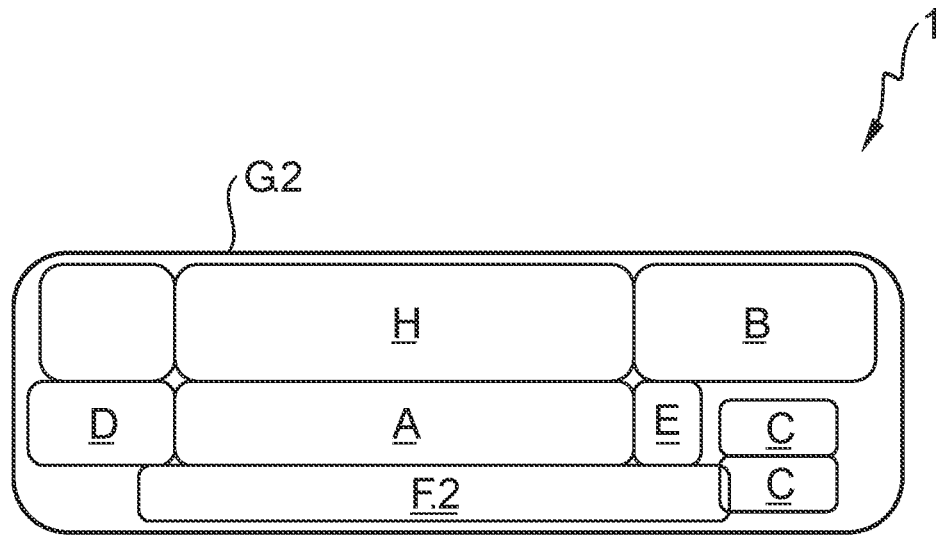
FIG. 2 is a schematic view of a first control unit having a first and a second module of the modular system of FIG. 1.

As can be seen in FIG. 1, a first control unit 1 comprises all modules A to E and H, an interface F.2, and a housing G.2. Thus, the first control unit 1 can provide all functions that can be implemented with the modular system. In addition, the interface F.2 and the housing G.2 are for use in a specific first motor vehicle model. The first control unit in the assembled state is shown in FIG. 2.

Figure 3:
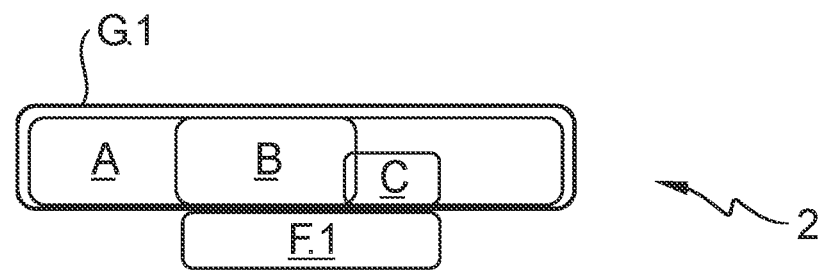
FIG. 3 is a schematic view of a second control unit with the first module and without the second module of FIG. 1.

A second control unit 2 comprises the modules A to C, an interface F.1, and a housing G.1. The second control unit 2 is thus free of the modules D, E, and H. Accordingly, the second control unit comprises no function for switching off the charging unit of the motor vehicle, no pre-charging circuit, and no DC converter, unlike the first control unit. By using the interface F.1 and the housing G.1, the second control unit is adapted for use in a specific second motor vehicle model. The second control unit in the assembled state is shown in FIG. 3.

A third control unit 3 comprises the modules A to C and E and an interface F.3 and a housing G.3. The third control unit is thus free of the modules D and H. Accordingly, the third control unit does not comprise a function for switching off the charging unit of the motor vehicle and no DC converter, by contrast to the first control unit. By using the F.3 interface and the G.3 housing, the third control unit is adapted for use in a specific third motor vehicle model.

The invention claimed is:

1. A modular system for forming control units for traction batteries of motor vehicles, the modular system comprising:
   plural first modules (A, B) and plural second modules (D, E, H),
   each of the plural first modules (A, B) being configured to:
   (a) determine a state of charge from cell voltages of several battery cells of one of the traction batteries;
   (b) control a discharge of the battery cells;
   (c) exchange data with at least one other component of the respective motor vehicle; and/or
   (d) establish and interrupt an electrical connection between the respective traction battery and the at least one other component of the respective motor vehicle,
   each of the plural second modules (D, E, H) being different from each of the plural first modules (A, B), the modular system being configured to define:
   plural first control units (1) for first traction batteries of first motor vehicles, each of the first control units (1) comprising one of the first modules (A, B) and one of the second modules (D, E, H); and
   plural second control units (2, 3) for second traction batteries of second motor vehicles, each of the second control units (2, 3) comprising one of the first modules (A, B) and none of the second modules (D, E, H).

2. The modular system of claim 1, wherein the second module (D, E, H) is configured to switch off a charging unit of the first motor vehicle for charging the first traction battery.

3. The modular system of claim 1, wherein the modular system further comprises a carrier module (C) for electrical fuses, the carrier module (C) being configured to carry first electrical fuses when used in the first control unit (1) and to connect the first electrical fuses electrically to first electrical components of the first traction battery, and the carrier module (C) being configured to carry second electrical fuses when used in the second control unit (2, 3) and to connect the second electrical fuses electrically to second electrical components of the second traction battery.

4. The modular system of claim 1, further comprising plural interfaces (F.1, F.2, F.3) and plural housings (G.1, G.2, G.3), the interfaces (F.1, F.2, F.3) are configured to be connected with the first module (A, B) and/or with the second module (D, E, H) and to relay data to the respective module (A, B, D, E, H) and from the respective module (A, B, D, E, H), the housings (G.1, G.2, G.3) are configured to accommodate the first module (A, B) and/or the second module (D, E, H), the interfaces (F.1, F.2, F.3) and the housings (G.1, G.2, G.3) are individually adapted to the first motor vehicle or to the second motor vehicle.

5. The modular system of claim 1, wherein each of the first modules (A, B) further comprises a digital data memory and a digital data processing unit, instructions being stored in the digital data memory, the data processing unit being configured to read out and execute the instructions, the instructions being configured for use in the first control unit and for use in the second control unit.

6. A method for producing one of the control units (1, 2, 3) of the modular system of claim 5, comprising selectively replacing the instructions stored in the data memory of the first control unit (1) and the second control unit (2, 3) respectively with different, vehicle-specific instructions.

7. The modular system of claim 1, wherein the second module (D, E, H) comprises a pre-charging circuit.

8. A motor vehicle comprising one of the first control units (1, 2, 3) of the system of claim 1 and the first traction battery.

9. The modular system of claim 1, wherein the second module (D, E, H) is configured to switch off a charging unit of the first motor vehicle for charging the first traction battery wherein the second module (D, E, H) comprises a DC converter.

* * * * *